United States Patent [19]
Johnson

[11] Patent Number: 5,251,420
[45] Date of Patent: Oct. 12, 1993

[54] WEBBED STRUCTURAL TUBE

[76] Inventor: David W. Johnson, 2601 Hoover, Suite H, National City, Calif. 92050

[21] Appl. No.: 909,390

[22] Filed: Jul. 8, 1992

Related U.S. Application Data

[62] Division of Ser. No. 636,489, Dec. 31, 1990, Pat. No. 5,197,253.

[51] Int. Cl.$^5$ .............................................. E04C 5/04
[52] U.S. Cl. .................................... 52/664; 52/648.1; 403/170; 403/253; 403/263
[58] Field of Search ............... 403/169, 170, 230, 250, 403/253, 263; 52/664, 648.1, 667

[56] References Cited
U.S. PATENT DOCUMENTS 5,185,982  2/1993  Hostetler ...................... 52/648.1 X

FOREIGN PATENT DOCUMENTS 7603046  9/1977  Netherlands ......................... 52/664

Primary Examiner—Carl D. Friedman
Assistant Examiner—Creighton Smith
Attorney, Agent, or Firm—Ralph S. Branscomb

[57] ABSTRACT

Construction utilizing composite pultrusion technology incorporates an internal web structure in the elongated members themselves, increasing the strength-to-weight ratio, while providing support for joint notches due to the strategic positioning of the webs. The joints themselves are modified to accommodate the exiting of one or two members from the joint at an oblique angle to provide more construction flexibility to make diagonal braces, for example. The improved techniques are incorporated into a power transmission tower which takes advantage of the electrical qualities inherent in composites to produce a mechanically and electrically strong tower.

13 Claims, 6 Drawing Sheets

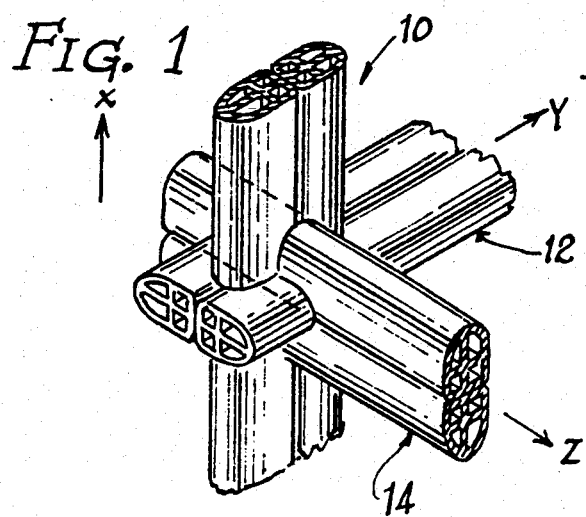
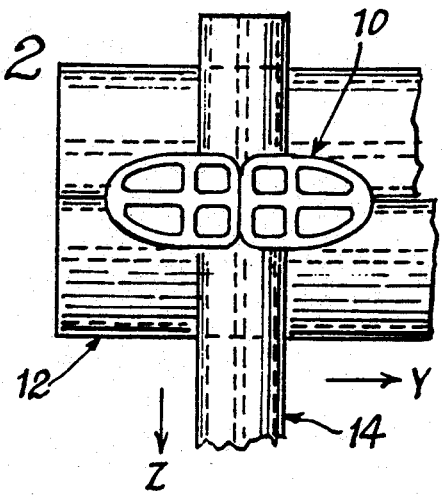
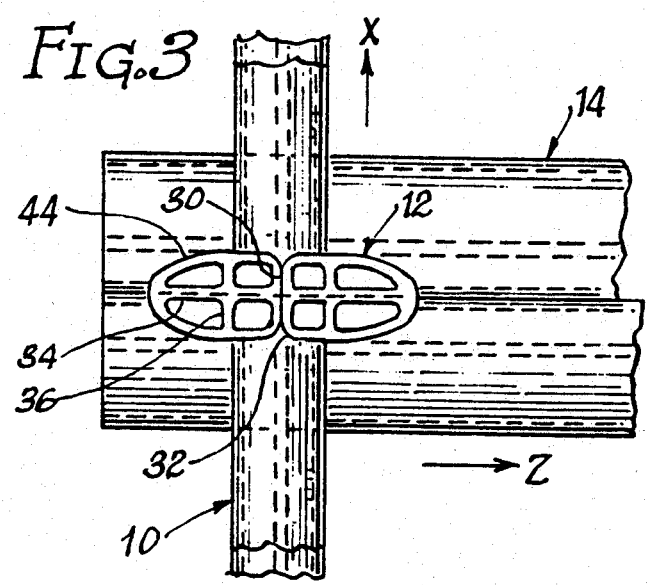
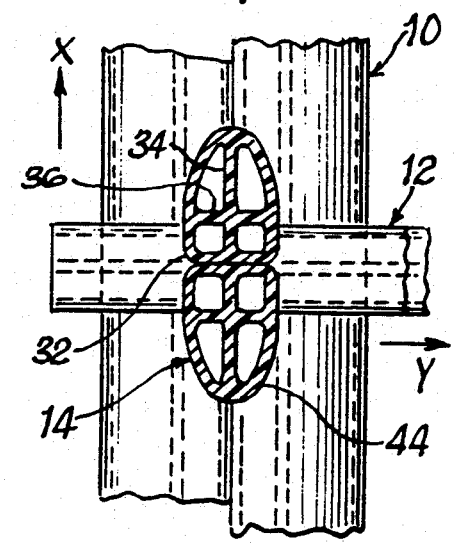
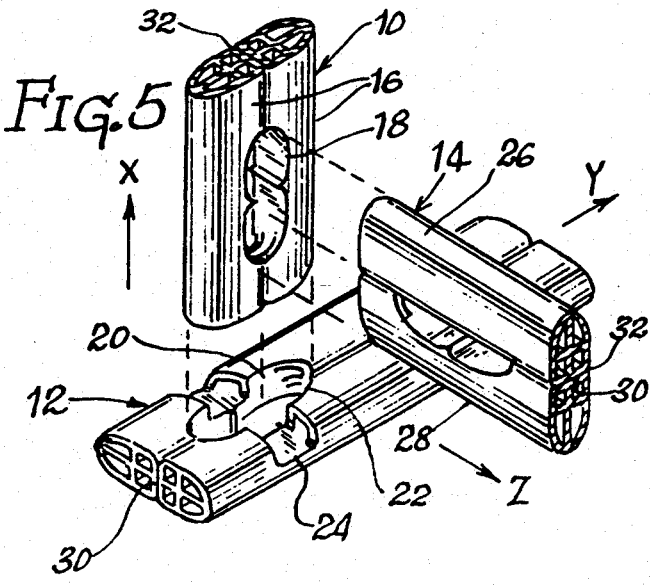
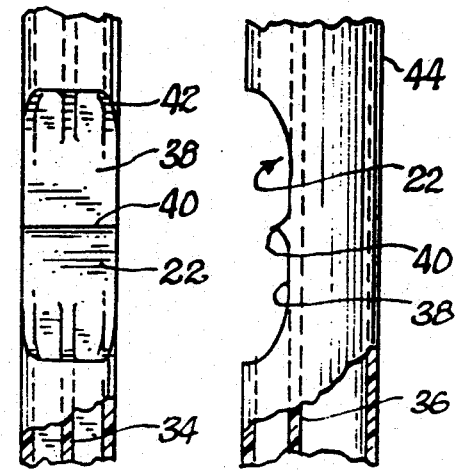

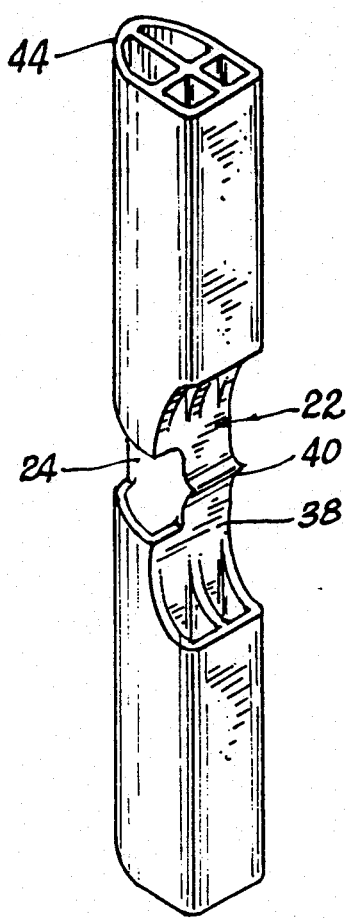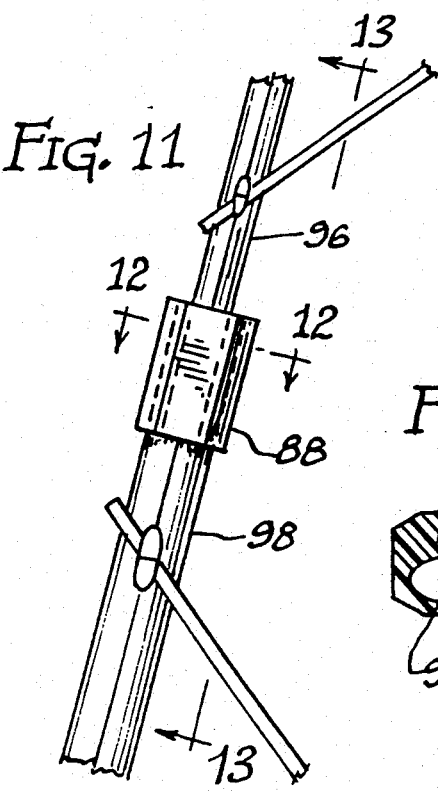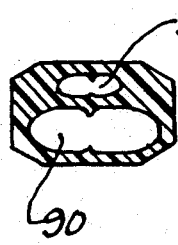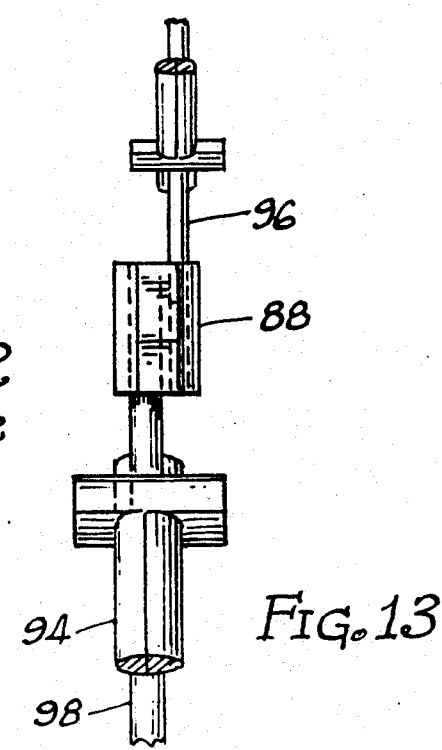

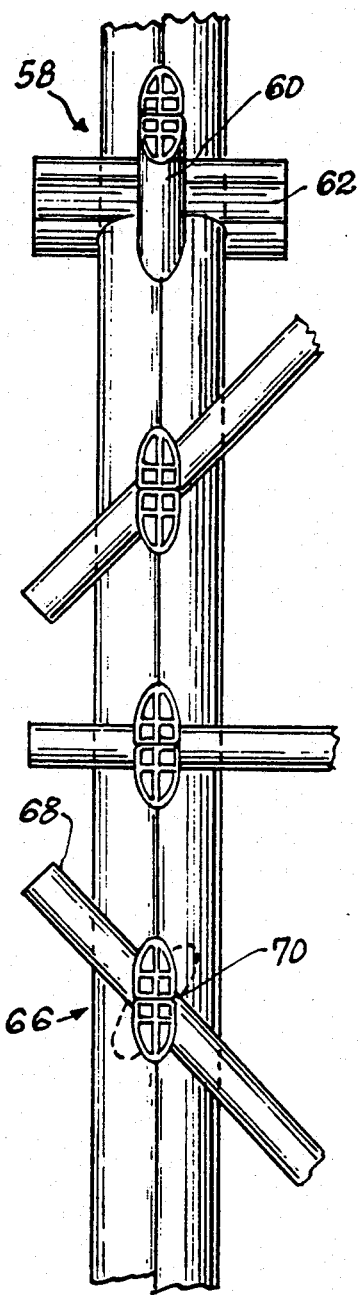
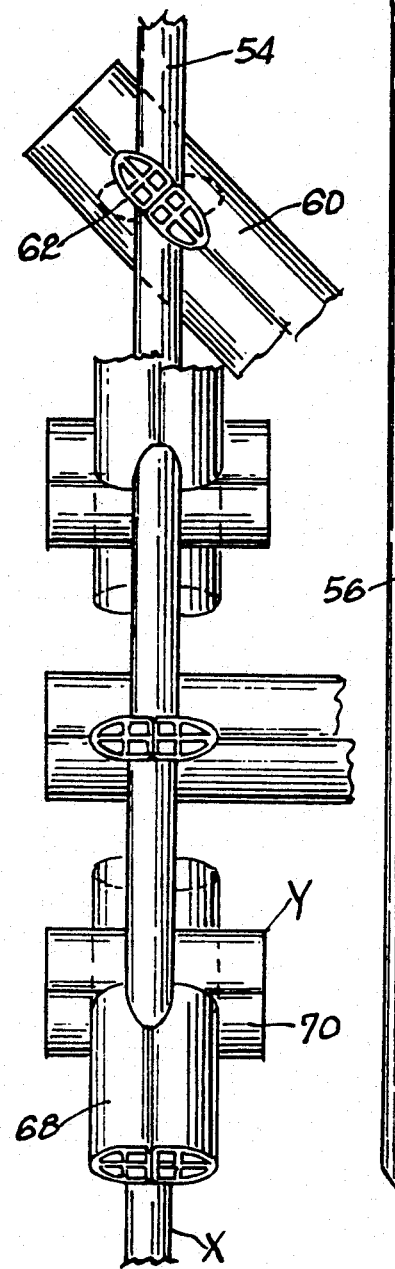
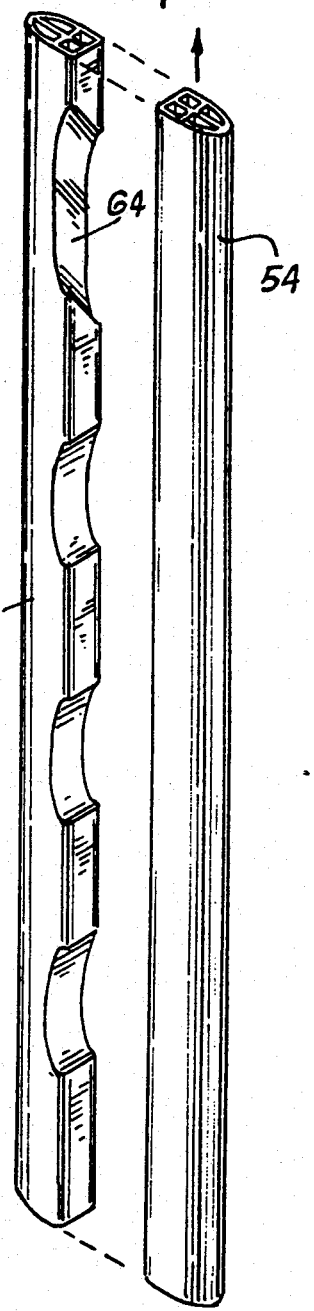
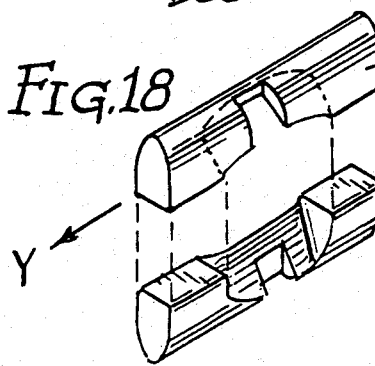
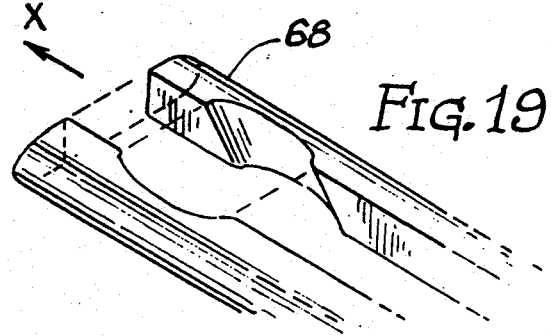

WEBBED STRUCTURAL TUBE

BACKGROUND OF THE INVENTION

This application is a divisional application of patent application Ser. No. 07/636,489 filed December 1990, now U.S. Pat. No. 5,197,253.

The invention is in the field of joint construction, and also the production of structural members from composites, and particularly composites produced by a pultrusion process.

Applicant is the inventor and the owner of U.S. Pat. No. 4,715,503 for an INTERLOCKING JOINT WINE RACK, U.S. Pat. No. 4,809,146 for an ENCLOSURE WITH INTERLOCKING FRAME JOINTS, U.S. Pat. No. 4,825,620 for a STRUCTURAL SUPPORT OF INTERLOCKING LATTICE CONSTRUCTION, and allowed U.S. patent application Ser. Nos. 231,379 for a SUPPORT STAND and 541,547 for INTERLOCKING SUPPORT STRUCTURES. All of these disclosures relate to an interlocking joint construction technique that can be used with any kind of construction material such as wood, steel, concrete or composites to make three dimensional, three-member joints without the use of fasteners or cement.

Although very useful for joining wood, steel and concrete, these materials are by their nature not terribly difficult to join together using conventional nailing, bolting, bracketing and cementing techniques. However, this is not true of composite construction. Composites, as a general rule, do not lend themselves to conventional joining techniques. A straight, pultruded composite structural member may have extremely high tensile strength, but suffer from the inability to join it to other members in a strong, durable joint.

Composite pultrusions are made from one of several processes developed to produce structural members made from fibers, such as graphite, or fiberglass, and a resin such as polyester, vinyl ester, or epoxy, see U.S. Pat. No. 3,556,888 issued to W. B. Goldsworthy. The pultrusion process involves pulling a group of resin-saturated fibers through an extrusion (actually pultrusion) die directly analogous to extrusion processes. One significant feature of a fiberglass pultrusion is that it can have the same tensile strength as steel with one fifth the weight. Much of the strength is in the longitudinal direction (the direction of the pultrusion), but substantial progress is being made to improve the inner laminar shear characteristics by introducing cross-directional, or omni-directional fibers or fabric into the pultrusion for fiber glass pultrusions.

The applicant's joint system as disclosed in the above-referenced patents and patent applications has been modified to produce a very efficient and novel system of connectivity for fiber glass pultrusions. As evidenced by the Goldsworthy U.S. Pat. No. 3,556,888, fiber glass pultrusions have been in production for over 30 years and the process is well understood. Most products produced today are advantageous for use as a single pultrusion for use as axe and hammer handles, poles and the like, but the assembly of multiple pultrusions has been limited by the weakness which is characteristic of the joints.

Joining techniques as currently recommended by pultrusion manufacturers comprise the use of a combination of mechanical fasteners and adhesive bonding. One manufacturer illustrates the joining of structural pultrusions using a combination of bolts and epoxy in a very time-consuming process, producing a joint that has an allowable stress limit of 1000 psi, compared to the allowable stress limit of 30,000 psi. for the pultrusion member itself. The joint is thus only one thirtieth the strength of the member itself. As this illustrates, strength loss at the joints in multi-member composite pultrusion construction is not a minor problem, but one which makes the use of composites impractical in an enormous range of structural implementations.

Obviously a simple, strong and effective system for joining these remarkable structural members is not evident in the connective technology developed to date.

Although this technology can be applied in hundreds of different fields, one area of particular interest in this disclosure is in the electrical field, and particularly high voltage, high power applications such as power transmission lines and towers. The advantages of high dielectric strength of fiber glass composites has allowed these materials to find their way into many electric utility applications. The high dielectric strength properties produces electrical insulative characteristics. Some applications within the electric utility industry for fiberglass pultrusions include ladders, switch lanyard poles, hot line equipment for linemen, structural interior rod for insulators, and booms for maintenance hoists known as "cherry pickers", to mention a few.

However, composites have not been used significantly in large structures such as power transmission line towers. Steel, aluminum and wood have been the only choices available to that industry for these structures. Wood (treated with creosote and other preservatives) has been a standard material, but eventually falls victim to decay or damage from birds and insects. Steel and aluminum have been used predominantly for lattice-type power transmission towers and substation structures. Although they are high-strength, the electrical conducting features of these metals make them the most imperfect and inadequate choice, given the availability of the materials of instant invention.

But again, one single drawback in the material properties of fiberglass pultrusions has prevented them from being used in many larger electrical utility structures requiring connecting of multiple members, which is, fiberglass pultrusions have low bearing strength. This has resulted in very poor performance of multiple member composite structures using conventional fastening and connecting techniques. Composite bolts have been developed in an attempt to overcome this drawback (and keep the joint system fully insulated and corrosion resistant) but these bolts have poor thread performance. Most systems have required fastening plus adhesive bonding at any pultrusion joint and still these joints have been significantly weaker than the pultrusion member itself.

Thus, although these materials have been used in electrical utilities for over 30 years, the absence of a good connective technology has prevented their use in large structures such as high voltage overhead power transmission towers and structural substation supports. The use of the applicant's connective technology with fiberglass pultrusion composites will offer many advantages to the world's electric utilities, well into the next century.

SUMMARY OF THE INVENTION

The instant disclosure relates to a new connective technology for composite pultrusions which accommodates the weaknesses in the pultrusions, as well as the positive advantages available in the pultrusion process for producing complex cross sections of pultrusions.

In the previous patents and applications mentioned above, structural members were generally shown solid and square in cross-section. In order to take advantage of the high strength-to-weight ratio inherent in composites, and in the interest of designing structures with increased moments of inertia, relative to weight, it is sometimes desirable to use hollow tubing. Applicant's connective system can be used to connect members which are not solid, but are hollow, and the pultrusion process has been developed to produce these shapes through the clever use of dies.

Applicant's technology involves machining only two types of keyways or notches in a single pultrusion shape. To take advantage of the sophisticated pultrusion techniques to produce complex cross sectional shapes, and to optimize this joint such that maximum effect is given to increasing the bearing surface area of connecting parts in contact inside the joint (which is necessary to compensate for the weakness of bearing strength in composite pultrusions) the shapes shown in the instant disclosure have been developed by Applicant. These shapes include the internal shape of the primary pultruded structural member itself, and joint configurations designed to produce three-dimensional joints having one or two of the three joint-forming members exiting the joint at a non-orthogonal angle such as would be useful in forming diagonal bracing, converging tower support structures and the like.

The connective joint illustrated in the present disclosure provides significant surface area between each of the members and thus significantly improves the problem of low bearing strength. With the increased strength-to-weight ratio provided by the internal web configuration, and the oblique interlocking joint construction, the technique of the invention is ideal for producing power transmission towers.

BRIEF DESCRIPTION OF THE DRAWINGS

FIG. 1 is a perspective view of an assembled joint of the invention;

FIG. 2 is a top plan view of the joint of FIG. 1;

FIG. 3 is a side elevation view looking end-wise at the left end of the Y-directional structural pair of FIG. 1;

FIG. 4 is an elevation view of the right end of the Z-members of FIG. 1;

FIG. 5 is an exploded perspective view of the joint;

FIG. 6 is a front elevation view of typical full notch;

FIG. 7 is a side elevation view of the typical full notch of FIG. 6;

FIG. 8 is a perspective view of a modified notched member;

FIG. 9 is a perspective view of full-notched member;

FIG. 10 is a perspective view of the keypost;

FIG. 11 illustrates a means of coupling the ends of two structural members;

FIG. 12 is a section taken along line 12—12 of FIG. 11;

FIG. 13 is an elevation view of the coupling of FIGS. 11 and 12;

FIG. 15 is a side elevation view of a typical multiple joint construction as would be used, for example, in power wire towers of FIGS. 25 and 26.

FIG. 16 is the section of FIG. 15 rotated 90 degrees to the right;

FIG. 17 is an exploded perspective view of the keypost and the full-notched member that makes up its member pair;

FIG. 18 is an exploded perspective view of the modified notch members, further modified to accommodate a diagonal cross-member;

FIG. 19 are two full-notched members modified to accommodate a diagonal through-piece;

DETAILED DESCRIPTION OF THE PREFERRED EMBODIMENTS

Figure 20:
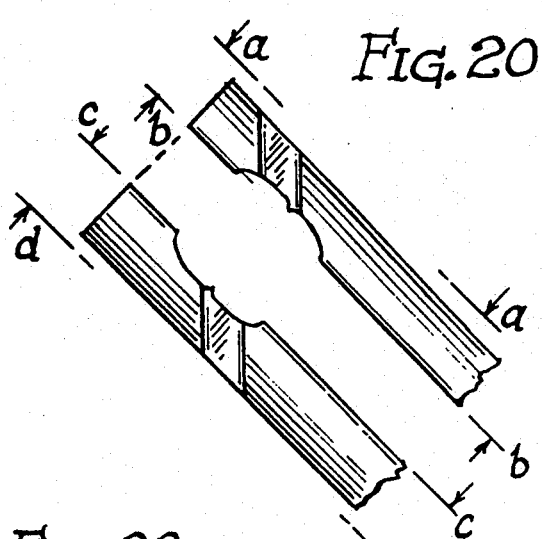
FIG. 20 illustrates a modified notch member pair, adapted for receiving an angulated cross-member.
Figure 21:
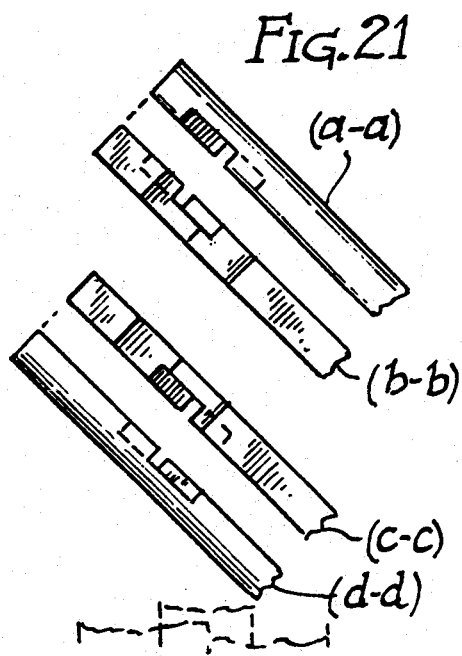
FIG. 21 illustrates the members of FIG. 20 as taken from the respective section line.
Figure 22:
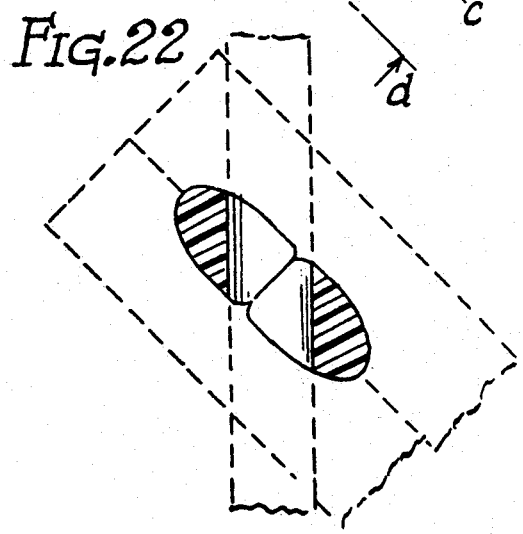
FIG. 22 illustrates the interfitting of three intersecting member pairs.
Figure 23:
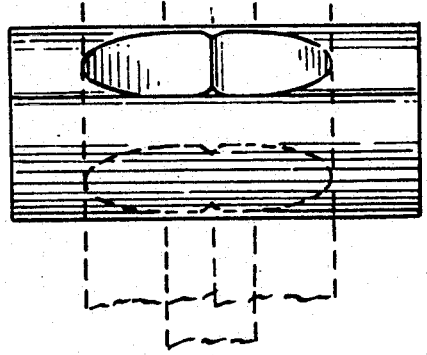
FIG. 23 is a side elevation view of the solid members of 22 as seen from the right side.
Figure 24:
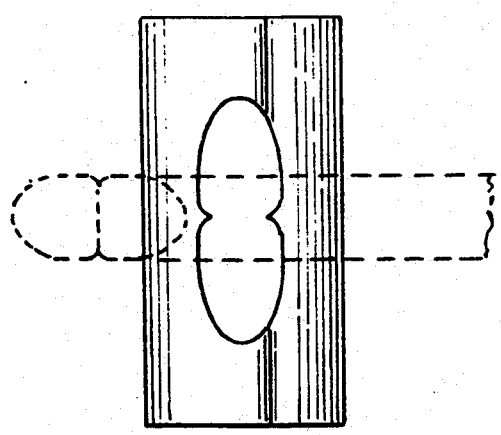
FIG. 24 is a plan view of the joint as seen from the top of FIG. 3.

A typical orthogonal joint is shown in FIG. 1. The joint is characterized by a beam 10 extending in the X direction, and beams 12 and 14 extending in the Y and Z directions, respectively. From outside of the joint, the beams appear to be substantially identical, although clearly they would have to differ from one another somewhat as they enter the joint.

The way in which the beams interlock is best illustrated in FIG. 5. Beam 10 is actually comprised of two full-notched beams 16, which, when mated together as shown in FIG. 5, define a pass-through opening 18 for beam 14. Beam 12 comprises a pair of mated modified notched structural members 20, each of which has a full notch 22 defined in it in exactly the same way as the full-notched beams 16, but transversely of the full notch 22 is a modified or partial notch 24. The pass-through opening defined in the Y directional beam 12 passes the beam 10. The remaining beam, which is beam 14 in the Z direction, comprises an un-notched keypost 26, and another full-notched elongated member 28, identical to the beams 16.

To assemble the beams, beam 10 is inserted down through the opening in beam 12, at which point the elongated member 28 is passed beneath beam 12 through the opening 18 in beam 10. Beam 10 is then pulled upwardly until the member 28 snugly seats beam 12, and then the keypost 26 is passed through the top part of the pass-through opening 18 in beam 10 to lock all the parts together. The resulting joint, illustrated in FIG. 1, is quite strong without the use of any fasteners. It is easy to provide adequately controlled tolerances so that the keypost 26 is a reasonably tight frictional fit.

This construction is substantially similar to that described in the prior issued patents and the Patent Applications referenced in the background, which illustrate the replication of joints to produce multiple cells and complex structures. The instant joint differs however in several respects. First, each beam is substantially elliptical in cross-section, as can be seen best in FIGS. 2, 3 and 4. This is because the ellipse is a very strong shape, and eliminates sharp edges which stress problems. Each of the structural members which defines half of a structural member pair or beam has a flat edge 30 with radiused edges 32, again to eliminate the added stress susceptability which sharp edges create.

In the prior art patents and patent applications, the six structural members which form the joint, forming into three structural member pairs each of which constitutes a beam, have been shown as solid. In this disclosure the elongated structural members are not solid, but rather hollow and reinforced with a web structure.

The webs of the web structure are two in the preferred embodiment for each elongated member. The first web 34 is referred to as the major web, and as establishing the major web plane because it lies along the major axes of the cross-sectional ellipses. This web bisects the elongated members in the wide direction, and provides a floor for the notches 24 cut into the structural members 20 of the beam 12. This is best seen in FIG. 5. The notch will be cut exactly halfway into the structural members 20, and thus if the major web bisects the members, the notch will be cut half way through the web to define a solid floor for the notch. As can be seen from FIG. 5, this provides a solid support for the bottom surface of the keypost 26, as the hollowed out shell that would otherwise bear against the keypost would be somewhat weakened.

The minor web 36 of each of the elongated members is very similar in positioning and purpose to the major web, but rotated 90 degrees. The minor webs are parallel to the minor axis of the ellipse formed by each beam, and are spaced away from the minor access half of the width of an elongated member to define floors for the full notches 22 which are cut into five of the six members. This structure is best seen in FIGS. 6 and 7. As seen from FIG. 6, the minor web 36 creates a substantially flat floor 38 for the full notch 22, as well as well as some stock for the radius-accommodating ridge 40. In addition to the minor web, the end portions of the full notch area 22 are each reinforced by the curved portion 42 which is cut from the major web.

The precise location of the webs, particularly the minor web, can be modified somewhat. For example, it might be desirable to position the minor web so that it will fall exactly at the bottom of the notch 22 without any milling. This could be done with the major web also, but is complicated by the fact that such an adaptation would require that the partial notch 24 be cut in a particular side of the elongated members, whereas if the web is central, the notch could be cut in either side.

Although it is conceivable that the shapes of the elongated members with the webs could be made in some other manner, composite pultrusion technology would almost certainly be the best choice of today's technologies. The shape illustrated can be pulled as a single endless pultrusion and then notched, possibly at the same time that it is being pulled. In thirty years of development, the materials and the technique have been improved to the point that the configuration disclosed herein with the voids, the webs, and the tubular external shell 44 could be made to be very strong and resistant to virtually any kind of corrosion or the attack of weather and ultraviolet light.

Figure 14:
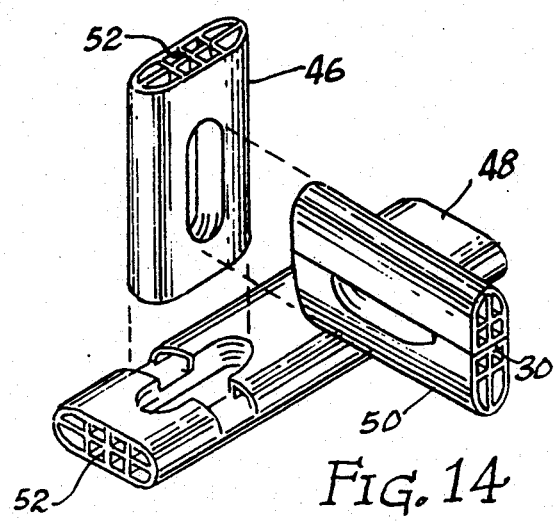
FIG. 14 is an exploded perspective view of a joint in which two of the three member pairs actually comprise single, unitary structures.

A slight modification of the structure illustrated in FIGS. 1 through 7 is shown in FIG. 14. The joint in this configuration is still comprised of the three beams 46, 48 and 50, corresponding to the beams 10, 12, and 14. The primary difference is that beams 46 and 48 are now each integral pieces rather than being composed of two elongated members faced together. When the members are made as a single unit, the mating interface may be left hollow, but would preferably be produced as another web 52 which would actually coincide with the minor axes of the various ellipses which are the cross-sections of the various beams. In order to make the joints interlock, the beam 50 must remain two separate members, identical to the beam 14.

The idea of the hollow elongated members and beams is, of course, to provide a lighter weight structure with a higher strength-to-weight ratio than a structure of identical weight using solid members. Because of the notching, the double-web construction as illustrated is a very practical construction to achieve this in. However, no doubt other types of construction wherein a combination of internal voids and solid portions are achieved would work well in particular implementations. For example, the tubular external shell 44 could be completely hollow, and filled with foam. Or, webs could be provided having a different configuration than the webs shown. The width to depth ratio of the illustrated is about 2.5:1, but of course this can be varied at will. It is easy to imagine the usefullness or beams having an aspect ratio of at least 5:1.

The size of the beams is virtually infinitely variable. They can be made as small as one quarter inch by half an inch with 0.020 inch wall thickness, using any one of hundreds of combinations of fibers from glass to high modulus carbon graphite. Conversely, for large structures such as off-shore oil platforms, the outside dimensions might be 24 inches by 8 inches, with inch-thick webs. In applications requiring extreme light weight and minimal stress, completely hollow beams could be used.

Turning to a different aspect of the invention, as illustrated and described in the previous patents obtained by the inventor the three beams that comprise the joint have been orthogonal. However, it is not necessary that this be the case. If one examines FIG. 1, and imagines that each beam is comprised of a series of loose laminates parallel to the mating face of the two elongated members comprising the beam and bound together such that the laminates can slide, one can imagine that pulling any one beam into an angular orientation would force the other beams to conform. The notches in pass-through openings would be distorted to accommodate the angled beam. This would happen if any beam were angled in the X-Y- or Z-direction, or a combination of these. From the perspective of cutting the notches so that the beams interfit with one beam at an angle, it is best that the beam only be angularly deflected in one dimension rather than two. Of course, particularly with computer-aided design, joints to produce any physically possible deflection which would be practical in some applications could be made. Also, it would be quite possible and not too difficult to produce a joint that had one of the members which forms the joint being smaller than the other two. This could be especially useful if the smaller member were a diagonal brace. Not only would this save material and weight, but the notches in the other members needed to accommodate the smaller member would be smaller, so that there would be less loss of strength.

One of the major applications for a joint having one member extending non-orthogonally is in diagonal bracing. An example of this is shown in FIGS. 15 through 19. Retaining the X-Y- and Z-directions from FIG. 5, the vertical members 54 and 56 run in the Z direction and include the keypost 54 and the full-notch member 56. With these two members establishing the vertical beam, examples of diagonals in both the X and Y direction can be seen. First, the joint 58 establishes a diagonal beam 60 extending in the Y direction. The beam 60 is comparable to the beam 12. It is comprised of two modified notch beams. Beam 62 extends in the X direction, comparable to the beam 10, and constitutes a pair of full notch beams. The notches are canted, such as the double notch 64, to accommodate the angulation of the diagonal beam 60.

To actually visualize the shape of the notches, the joint 66 has been exploded in FIG. 17, 18 and 19 to reveal the internal notch configuration. It should be noted that the upper joint, joint 58, utilizes a diagonal beam 60 which is flattened in the vertical plane, whereas the type of joint indicated at 66 uses a diagonal beam 68 which is flattened in the "horizontal" plane. The beam 68 extends in the X direction, with a short cross piece 70, illustrated in FIG. 18, extending the third, or Y-direction. The notches are the same in these beams as they are in FIG. 5, and will not be further described other than to note that the notches in both beams 68 and 70 are slated to accommodate the diagonal extension of the exiting member from the joint. The term "oblique" is used in the claims to indicate any angle other than orthogonal, although obviously whether the angle is actually oblique or acute depends on from where it is measured.

Figure 25:
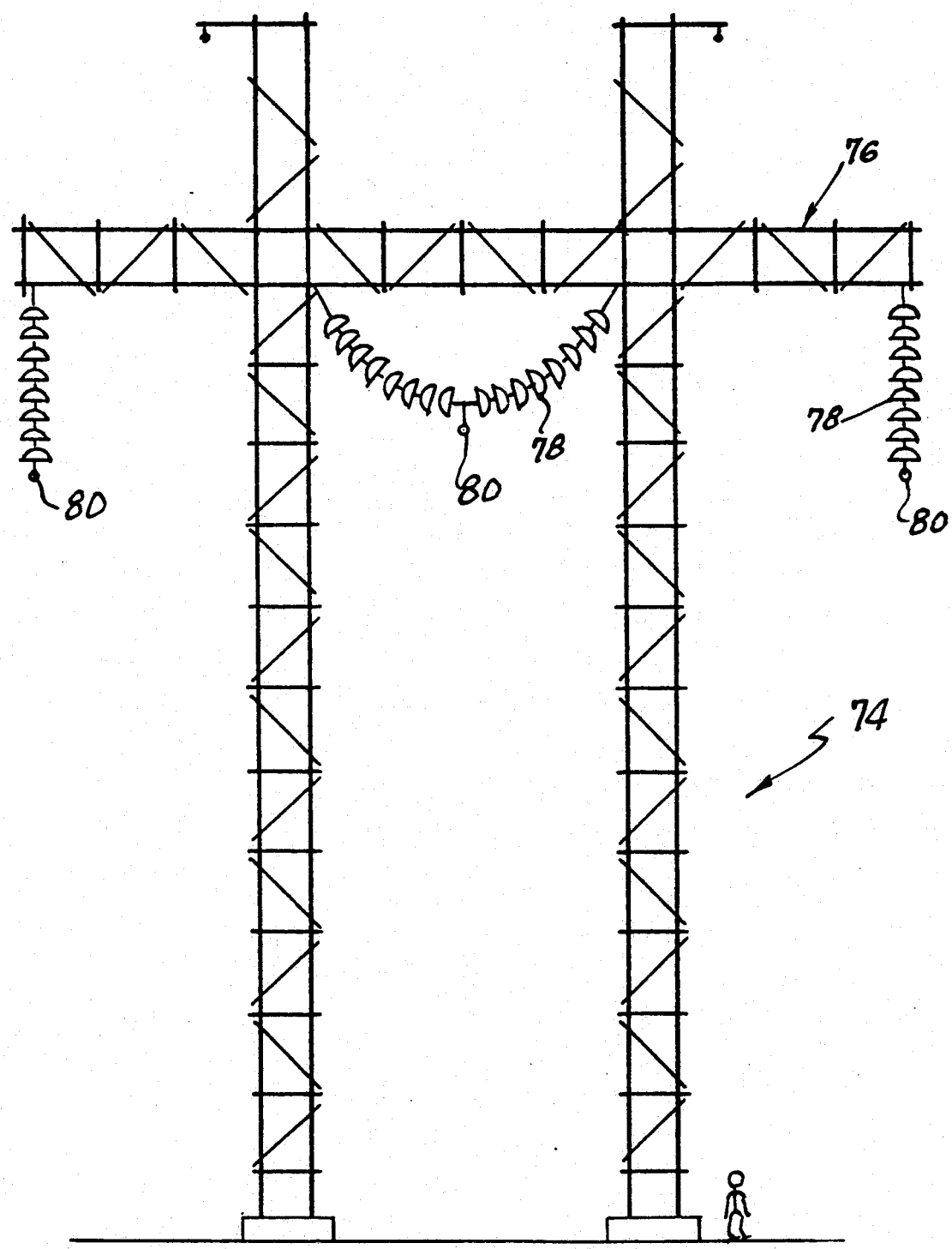
FIG. 25 is diagrammatic view of a first type of power wire support tower.

In any event, the construction illustrated in FIGS. 15 through 19 would be typical of a structure such as that shown in FIG. 25 wherein a the stanchions of a transmission tower 74 are comprised of a series of cross and diagonal bracing. It can be readily visualized how this complete stanchion structure could be assembled from the techniques illustrated in FIGS. 15 through 19. It would be irrelevant to the feasibility of use of the materials whether the individual structural members were semi-ellipses as shown, square, or some other external configuration, or whether they were hollow or solid. When the structure is on a large scale and is made for use in weather conditions such as is a transmission tower, the eliptical shape is advantageous in that it reduced wind loading compared to a tower made of square members.

At the top of the two stanchions of the power line support tower 74 there is a power wire support means 76 in the form of a horizontal truss, which supports insulators 78 and the power wires at 80. The truss could also be made according to the illustrated construction techniques. There are ordinarily three wires carrying three phases of current. They must be spaced away from each other and the ground, and the tower if the tower is metallic, sufficiently that they do not "flash over" in the wind. The composite construction allows the power wires to be connected directly to the tower rather than to an insulator, and the absence of a metal mass between the wires allows them to be put closer together. The closer the three phases are together, the less effective resistance is offered by the wires, so the composite construction is beneficial in a number of ways.

The diagonal braces are both compression and tension braces. In the event horizontal supports are used as shown, the braces can be jointed between the horizontal members in an eccentric bracing configuration as shown. This form of bracing reduces the joint weakness inherent in having too many members in one joint.

Figure 26:
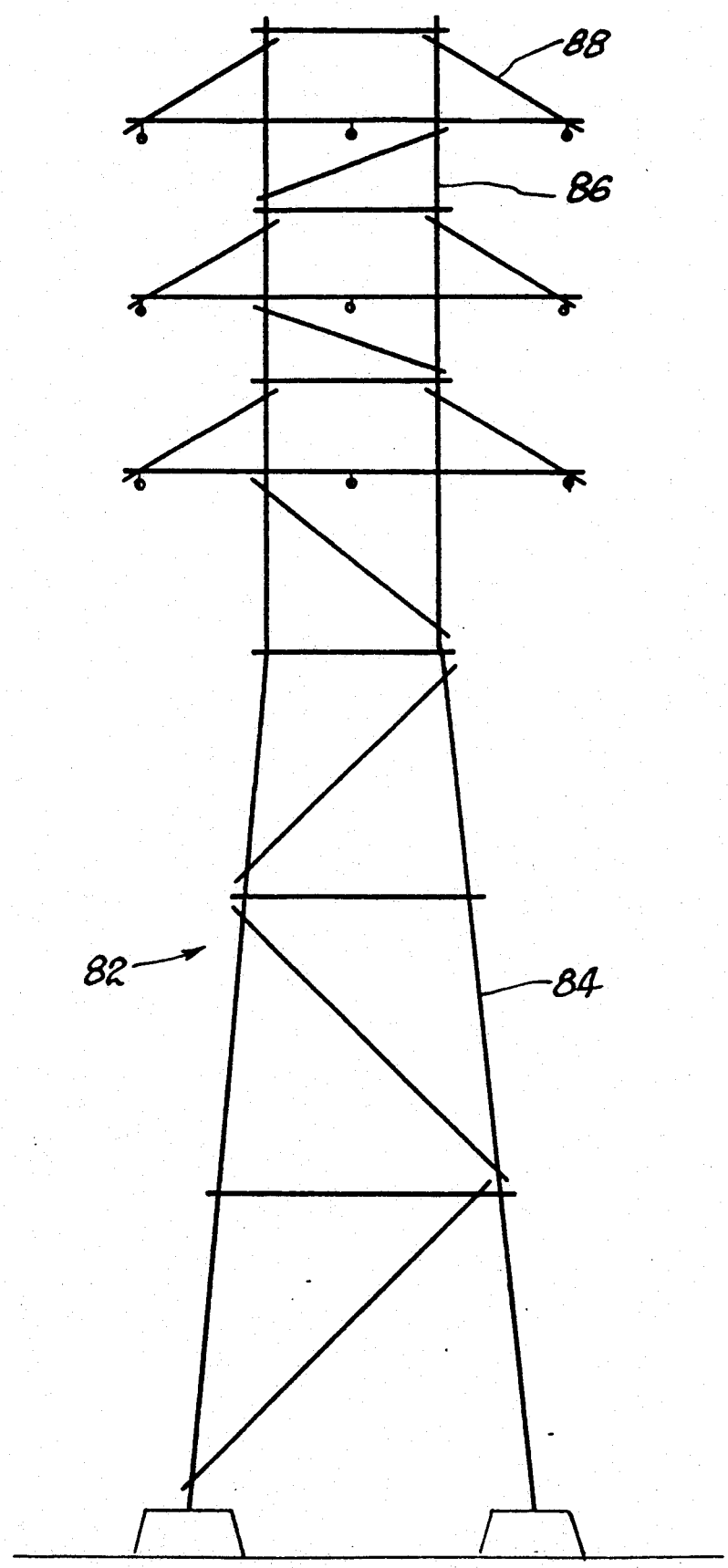
FIG. 26 is a diagrammatic illustration of a second type of power wire support.

FIG. 26 illustrates a more common type of power line support tower 82. Although only one face is shown, the other faces are similar and have not been drawn to avoid redundancy. This type of tower has a converging stanchion 84, which becomes parallel midway up, supporting a straight section 86 which in turn supports power wire support means 88 in the form of stanchions. The transmission wires could be attached directly to the trusses, rather than being connected through an insulator, since the composites are inherently insulating. Because the joint of the instant disclosure can accommodate one, or even two, exiting beams exiting at a variety of angles, construction of the tower shown in FIG. 26 from the interlocking joint, pultruded composite technique would be possible. The added complexity of the converging lower section of the tower could easily be accommodated with the assistance of computer-aided design. The top section would also be relatively straightforward, and the trusses could also be assembled using interlocking joints.

It is possible with this construction to have what amounts to an endless beam comprised of a number of segments which butt up against their continuation lengths inside a joint, so that externally the beam appears to be continuous. In a two-member beam, of course the butt joints between segments would be staggered.

However, a sleeve could be used as shown in FIGS. 11 through 13. The sleeve itself, indicated at 88, has one pass-through opening 90, and a second 92 alongside it as shown in FIGS. 11 and 13. These could accommodate the inserted ends of beams 94 and 96, respectively. The ends of the beams are pinned, cemented, or otherwise captured within the sleeve. As shown in FIGS. 11 through 13, the sleeve also makes a convenient means of attaching a smaller continuing beam to a larger beam. This might be done, for example, between the two segments of the tower of FIG. 26. It could also be done to add an upper section onto a lower, fire-proof section of slightly different construction such as pultrusion-reinforced concrete. The sleeve coupling could be made in the same type of pultrusion process as the other members. It would be easy to thread wires fron one section through the coupling to the ajoining section, for example if a ground wire were run through the hollow pultrusion frame to the top of the tower.

Certain requisites of the power transmission support tower make the interlocking composite construction details herein ideal. As mentioned in the background, first and foremost is the non-conducting nature of pultruded composites. In addition, composites are by nature very durable and when properly coated can be almost completely impervious to weather, resisting ultraviolet, wind, rain, snow, freezing and thawing and the like indefinitely.

By dint of their inherently insulating properties, it would be possible to eliminate, or at least shorten, the insulating connectors that are currently necessary for connecting the transmission wires to the towers. The tower design can be made more compact, reducing material, construction, and right-of-way costs. The towers would be safer both to linemen and the public. A line which falls on the tower would not create the same hazards.

The non-conductive quality of the composite beams also means there would be less power loss from current induced in the tower by the rapidly oscillating electric/magnetic field of the high-voltage power lines. The elimination of bolts in the construction process reduces construction cost, is simpler, and eliminates the increasingly worrisome problem of structural failure due to the inadvertent use of counterfeit bolts. The substantial elimination of corrosion eliminates rust and produces a longer life, probably more than 50 years. This is especially significant when considering the remote and often almost inaccessible location of many towers, which have to be placed by helicopter.

However, uses for this construction are limited only by the imagination. Thousands of different types of structures could be created using the simple interlocking configuration, with lightweight, strong members which are virtually indestructible.

I claim:

1. Structural member for use in an interlocking joint of similar structural members in which at least one notch is defined in some of said similar structural members to interlock to define said joint substantially rigidly, said structural member comprising:
   (a) an elongated hollow tubular shell;
   (b) at least one notch defined in said structural member; and,
   (c) at least one internal transverse reinforcing web substantially spanning the length of said tubular shell and at least in part defining a floor for said notch to support a member seated therein.

2. Structure according to claim 1 wherein said structural member is one of a first pair of structural members which are paired together to define, as a pair, a pass-through notch for another pair of structural members.

3. Structure according to claim 2 wherein said structural members of said first pair substantially define a mating plane and each defines an internal reinforcing web substantially perpendicular to said mating plane and defining a major web plane substantially bisecting the structural members in said first pair, and said at least one notch is entrant into each of said structural members from said mating plane.

4. Structure according to claim 3 wherein said structural members of said first pair together define a mating plane and each of said structural members defines an internal reinforcing web defining a minor web plane substantially parallel to said mating plane.

5. Structure according to claim 4 and including another reinforcing web in each structural member defining a major web plane perpendicualr to said reinforcing web defining said minor web plane.

6. Structure according to claim 1 wherein said elongated tubular shell substantially defines a semi-ellipse in cross section, said semi-ellipse defining a major axis and a minor axis.

7. Structure according to claim 6 wherein said reinforcing web lies substantially in the plane defined by the major axes of the semi-ellipse cross-sections of the tubular shell and comprises a first web.

8. Structure according to claim 7 and including a second web substantially perpendicular to said first web and defining a minor web plane substantially parallel to the minor axes of the cross-sections of said tubular shell.

9. Structure according to claim 6 wherein said elongated tubular shell defines a substantially flat mating surface having edges, and said edges are radiused.

10. Structure according to claim 1 wherein said elongated hollow tubular shell is substantially oblong in cross-section with an internal notch, and said at least one major internal transverse reinforcing web substantially bisects said shell along its long dimension.

11. Structure according to claim 10 and including at least one minor reinforcing web substantially perpendicular to said major web.

12. Structure according to claim 11 and including two minor reinforcing webs spaced on opposite sides of the center of said shell a distance substantially equal to half the thickness of said structural member.

13. Structure according to claim 1 wherein said structural member comprises a pultruded composite.

* * * * *